United States Patent
Wainwright (10) Patent No.: US 7,817,158 B1
(45) Date of Patent: Oct. 19, 2010

(54) SPECIFYING OPERATIONS TO BE APPLIED TO THE ATTRIBUTES OF A SET OF OBJECTS

(75) Inventor: John Wainwright, Los Gatos, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/426,143

(22) Filed: Oct. 22, 1999

Related U.S. Application Data (60) Provisional application No. 60/105,512, filed on Oct. 23, 1998.

(51) Int. Cl.
G09G 5/00 (2006.01)
G06T 15/00 (2006.01)
G06T 13/00 (2006.01)

(52) U.S. Cl. .................. 345/581; 345/419; 345/619; 345/473

(58) Field of Classification Search .................. 345/473, 345/419, 474, 619, 581, 475, 689; 707/513, 707/514
See application file for complete search history.

(56) References Cited

U.S. PATENT DOCUMENTS

| | | | | |
|---|---|---|---|---|
| 5,459,829 A | * | 10/1995 | Doi et al. ................. 345/619 |
| 5,689,437 A | * | 11/1997 | Nakagawa ................. 345/468 |
| 5,886,707 A | * | 3/1999 | Berg ........................ 345/619 |
| 6,040,842 A | * | 3/2000 | Wavish et al. ............. 345/473 |
| 6,078,935 A | * | 6/2000 | Nielsen .................... 707/513 |
| 6,105,036 A | * | 8/2000 | Henckel .................... 345/419 |
| 6,115,053 A | * | 9/2000 | Perlin ....................... 345/475 |
| 6,285,380 B1 | * | 9/2001 | Perlin et al. ............... 345/473 |
| 2002/0008703 A1 | * | 1/2002 | Merrill et al. ............. 345/473 |

* cited by examiner

*Primary Examiner*—Chante Harrison
(74) *Attorney, Agent, or Firm*—Patterson & Sheridan, LLP (57) ABSTRACT

A method and apparatus are provided for specifying that an operation should be performed on an attribute of each object of a group of objects. A statement, for example, in a script, specifies an operation to perform on an attribute of a set of objects. The statement may specify the set in a variety of ways that may be easier to program. According to an aspect of the present invention, the statement may specify an operation identifier and pattern matching criteria for identifiers associated with objects. Objects that are associated with identifiers that satisfy the pattern matching criteria are identified, and for each identified object, the operation is applied to the attribute of the object. According to another aspect of the present invention, the statement may specify an operation identifier and an identifier associated with a collection of objects. The operation is applied to the objects that belong to the collection of objects.

20 Claims, 3 Drawing Sheets

SPECIFYING OPERATIONS TO BE APPLIED TO THE ATTRIBUTES OF A SET OF OBJECTS

RELATED APPLICATION

This patent application claims priority from U.S. Provisional Patent Application No. 60/105,512, filed on Oct. 23, 1998, entitled 3-D MODELING THROUGH A SCRIPTING LANGUAGE, which is hereby incorporated by reference in its entirety.

FIELD OF THE INVENTION

The present invention relates to applications that use GUI interfaces, and in particular, to applications that may execute scripting languages that define instructions that correspond to user input that may entered through a GUI.

BACKGROUND OF THE INVENTION

Computer generated 3-D animations enrich a wide range of human experience, captivating audiences at the movie theaters, gluing garners to their personal computers, and embarking home buyers on virtual tours of new homes. To generate 3-D animations, a 3-D designer creates 3-D computer models of the entities using computer aided design systems (CAD). These models are used to emulate the movement, color, and shape of animated entities, from a dancing baby to space ships trekking through the universe.

3-D models are often composed of graphical components that represent the shapes and surfaces that make up modeled entities. A graphical component is a set of data, procedures, or a combination thereof, used to represent a geometry, such as a curve or the surface of a car. A graphical component may consist of multiple other graphical components, to represent more complex geometry, such as a car or human individual.

3-D models are built by users using a Computer Aid Design ("CAD") system. The user enters commands and data into the CAD system, and in response, the CAD system generates graphical components. Typically, a user enters commands and data through a graphical user interface ("GUI").

A GUI is a visual display that allows a user to enter commands and data into a computer system by using user input devices, such as a mouse, to manipulate and interact with user interface controls such as a window, a button, a dialogue box, and graphics that represent graphical components. Typically, a graphical user interface used in a CAD system includes a display in which graphical components are "interactively rendered". The term interactively rendered refers to updating the display of the graphical components, in response to receiving user input, to reflect the user input. Even more, a user may modify graphical components by using an input device to manipulate the rendered graphical components. Thus, the GUI enables users to visualize the graphical components they create and edit.

For example, a user modifies graphical components depicting a human standing in a room. To change the position of the human within the room, a user uses a mouse to drag the human to a new position within the room. To turn the human around so the human is facing the opposite direction, the user uses the mouse to rotate the human.

GUIs are used to create frames for animations. A frame is the state of a set of graphical components at a particular point in time. Animations are generated by displaying a sequence of frames at a particular frequency, such as thirty times per second. For example, a sequence of frames may be used to animate marbles rolling across the room from the left side of the room to the right. Each frame of the sequence would include a graphical component for each of the marbles. In the first frame the marbles are at the far left of the room. In the second frame, the marbles are positioned a little closer to the right, and so forth. The marbles are rendered in positions that are shifted in each of the frames, which are displayed in rapid sequence to animate the marbles rolling across the room.

To generate a sequence of frames, a user through the GUI interface on a CAD system may generate data specifying the state of the frames. For example, a user is creating data that specifies the state for each frame in a sequence of frames. For a given frame, the user moves each of the marbles to a different position by dragging an image of the marble displayed in the GUI, storing data for the frame, then dragging each of the marbles to their next position, and storing data for another frame, and repeating these manipulations for each of the remaining frames.

Consequently, to generate a sequence of frames, a user may repetitively perform the same GUI manipulations. Often, user input that is created by repetitively performing the same kinds of manipulations may be entered more efficiently through the use of a scripting language. A scripting language is a computer language that contains instructions that correspond to user input that may be entered through a GUI. This allows users of CAD systems, with little or no training in programming, to develop scripts because the scripts contain instructions that correspond to familiar ways of entering input through a GUI. In addition, the scripting language, like computer languages in general, define control constructs that may be used to control the execution of programs written in a scripting language ("scripts"), and automatically repeat the execution of a set of instructions. A for loop is an example of such a construct. For example, the following script EX illustrates how lines of instructions may be written in a scripting language to input commands and data more efficiently into a CAD system.

```
for fr in 1 to 1000 by 10 do (
delta+=5
create_frame(fr)
move marble1.position(delta,0,0,fr)
move marble2.position(delta,0,0,fr)
move marble3.position(delta,0,0,fr)
move marble4.position(delta,0,0,fr)
move marble5.position(delta,0,0,fr)
store_in_frame(fr)
)
```

The preceding "for" loop is repeated 100 times to create frames used to animate marbles accelerating across the room. During each iteration, the scripting language specifies that:
  (1) a new frame should be created that is associated with the integer sequence fr,
  (2) five marbles should be moved across the room along the X axis for 100 units at a distance represented by delta, which is increased during each iteration,
  (3) the new position of each of the five should be recorded in the frame by storing data associated with the frame fr.

Very often developers of scripts program tasks that apply the same operations to each graphical component in a set of graphical components. A task that involves performing the same or substantially similar operation on a set of graphical components is referred to herein as a duplicated task. A duplicated task may be programmed by explicitly writing lines that each specify the same operation, each line referencing a particular graphical component in the set. For example, script EX specifies that the same move operation is to be performed on the graphical components marble1, marble2, marble3, marble4, and marble5.

Obviously, writing very similar lines of code that each specify an identical operation is a repetitive task. In addition, writing a group of such lines to program a duplicated task may frustrate another purpose for writing scripts or programs in a computer language, which is to describe a task or algorithm to a reader of the script or program. Multiple lines of code, that specify substantially the same task, describe a duplicated task inconcisely, and thus impede comprehension of the script.

To program a duplicated task more efficiently, aggregate data structures, such as arrays, may be used for managing collections of graphical components. For example, a user may write a script that declares array structures with elements, each element referencing an object. A user may program the duplicated task by, for example, writing a for loop for iterating through the array, and for each object referenced by an element of the array, performing the same operation.

Use of aggregate data structures and programming constructs for executing tasks repetitively, such as arrays and for loops, requires application of programming techniques that are often unknown to users of CAD systems. While the users of CAD systems may be experts at using a CAD system through a GUI, many such users have received no training in programming.

Based on the foregoing, it is desirable to provide a technique for programming duplicated tasks that does not require programming constructs, such as a for loop, for repeatedly executing the same operation.

SUMMARY OF THE INVENTION

A mechanism is described for specifying that an operation should be performed on an attribute of each object of a group of objects. A statement, for example, in a script, specifies an operation to perform on an attribute of a set of objects. The statement may specify the set in a variety of ways that may be easier to program. According to an aspect of the present invention, the statement may specify an operation identifier and pattern matching criteria for identifiers associated with objects. Objects that are associated with identifiers that satisfy the pattern matching criteria are identified, and for each identified object, the operation is applied to the attribute of the object. According to another aspect of the present invention, the statement may specify an operation identifier and an identifier associated with a collection of objects. The operation is applied to the objects that belong to the collection of objects.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for executing a scripting language is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Overview

A CAD system interprets statements in a script. The script includes statements that specify an operation to perform on an attribute of a set of objects. A single statement may specify the set in a variety of ways that may be easier to program. For example, the statement may specify pattern matching criteria for identifiers associated with objects. Objects that are associated with identifiers that satisfy the pattern matching criteria are identified, and for each identified object, the operation is applied to the attribute of the object. A single statement should be easier program and understand as compared to conventional approaches to programming a duplicated task, which may require a separate statement to address each object in the set of objects.

Terminology

The term "object", as used herein, refers to any data structure with one or more fields, which are referred to herein as attributes. The attribute of an object may be an object. The term object encompasses, but is not limited to, the kinds of objects developed according to object-oriented design techniques. In object-oriented design techniques, an object is not only associated with attributes, but with methods or routines. Objects also belong to a class. A class definition defines the attributes and the methods associated with objects that belong to the class.

An "object identifier" is data, such as a string of characters, that identifies one or more objects. An "attribute identifier" is data, such as a string of characters, that identifies an attribute. An object-attribute-identifier identifies a particular attribute of a particular object. An object-attribute identifier may be in the form referred to herein as object-dot-notation. Object-dot-notation has the following format.

<object indicator>.<attribute identifier>

<Object indicator> is data that identifies one or more objects. To identify a single specific as object, the object indicator is an object identifier. Other forms of object indicators shall be later described. For the purposes of illustrating object identifiers, attribute identifiers, and the object-dot-notation, consider the following object-attribute reference (EX):

mychair.color

The object identifier "mychair" refers to an object that is a graphical component that represents a chair. The attribute identifier "color" refers to an attribute of the object that defines the color of mychair. Object-attribute reference EX conforms to object-dot notation.

A statement is a unit of code that specifies one or more operations to perform with respect to one or more objects. A statement includes an "operation identifier", which is data, such as a string of characters, that identifies an operation to perform. A statement may also include an object-attribute identifier, and other data that, for example, specifies parameter values for the operation.

The object identifier or object-attribute identifier may be referenced by the operation identifier. The term "reference" refers to an identifier appearing in such a manner within a program, such as a script, such that, according to the governing syntactic rules, the identifier should be interpreted as being directed to a particular item, such as another identifier. The techniques illustrated herein use a form of referencing where an operation identifier references another identifier when the operation identifier precedes and is adjacent to the other identifier. To illustrate this form of referencing, the following statement EX is provided.

move chair.position [0,0,0]

Figure 1:
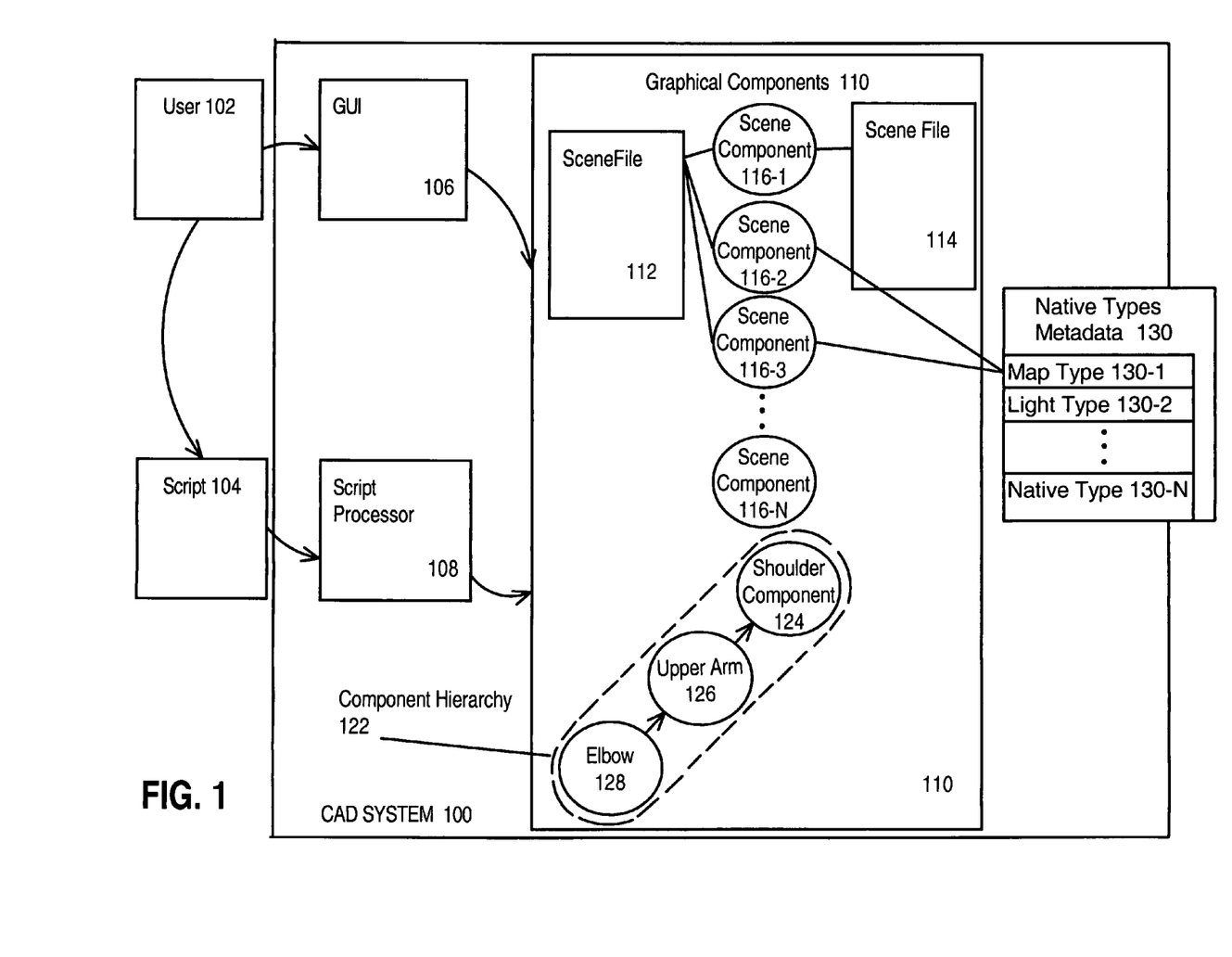
FIG. 1 is a block diagram depicting a CAD system according to an embodiment of the present invention.

The string 'move' is an operation identifier that identifies an operation for moving a graphical component within a scene. The string 'chair.position' is an object-attribute identifier that identifies the position attribute of an object. The string '[0,0,0]' identifies parameters for the operation. When executing a statement that includes an operation identifier that references an object-attribute identifier, CAD system 100 applies the specified operation to the attribute of the object associated with the object identifier. Thus, when CAD system 100 executes the statement EX, it applies the move operation to the attribute "position" of the graphical component "chair", altering the state of "chair" to reflect the new position within a scene.

When executing a statement that specifies an operation to be applied to an attribute, applying the operation to the attribute may entail tasks other than simply updating the identified attribute. These other tasks may include complex computations, and changing the value of other attributes, including attributes of other objects not associated with the object identifier. For example, the operation of moving a chair may involve updating a scene file to reflect the graphical component's new position, updating a frame, determining the graphical component's new position, moving other related graphical components that depend on "chair", recalculating the affect of lighting on "chair", and updating other attributes of "chair" that control its appearance.

Exemplary Cad System

FIG. 1 is a block diagram that depicts a user 102, and an exemplary CAD system 100 upon which an embodiment of the present invention may implemented. User 102 may interact with GUI 106 to create graphical components 110 in CAD system 100. Graphical components 110 include scene files 112 and 114. A scene file is a file that stores data representing an animation. A scene file includes data that defines which graphical components are included in a scene ("scene components"), and the pose and position of each of those components in a particular frame. Scene file 112 includes scene components 116-1, 116-2, and 116-3. Scene file 114 includes scene component 116-1 and 116-2.

User 102 may also generate one or more scripts and store them in script 104 using standard utilities, such as text editors. User 102 then submits script 104 for execution by script processor 108. Script processor 108 interprets script 104, and causes CAD system 100 to create graphical components 110 as specified by the interpreted scripts.

The script file need not have been created by a user. Rather, CAD system 100 may process scripts from any source. For example, the scripts in script 104 may be generated by an application that translates graphical data representing a city into scripts. Alternatively, a CAD system may process scripts received as a stream of data over a network.

Graphical components in CAD system 100 may belong to a "native type" supported by CAD system 100. A native type is a category of graphical components defined by metadata in CAD system 100. In object-oriented terminology, a native type is an object class whose attributes are defined by metadata. Native types may not be modified by a user. Examples of native type are maps, which are graphical components that represent textures, or lights, that define lighting in a scene. Native type metadata 130 is metadata that defines native types 131-1 through 130-N. Scene components 116-2 and 116-3 belong to map type 130-1.

The geometry of some graphical components may depend on other graphical components. Graphical components whose geometry depend on other graphical components are herein referred to as relative graphical components. For example, elbow component 128, upper arm component 126, and shoulder component 124 illustrate relative graphical components. An elbow's position depends on the upper arm's position, and the upper arm's position depends on the shoulder. Similarly, elbow component 128 depends on upper arm component 126, and upper arm component 126 depends on shoulder component 124.

A "parent graphical component" is a graphical component upon which a relative component depends. A graphical hierarchy is a set of graphical components that includes (1) one parent graphical component that does not depend on any other graphical component in the set, and (2) one or more other graphical components that depend directly or indirectly upon the one non-dependent parent component. Component hierarchy 122 is an example of a component hierarchy. Shoulder component 124 is a parent to upper arm component 126, and upper arm component is parent to elbow component 128.

Identifier-Patterns that Specify Matching Criteria for Object Identifiers

Figure 2:
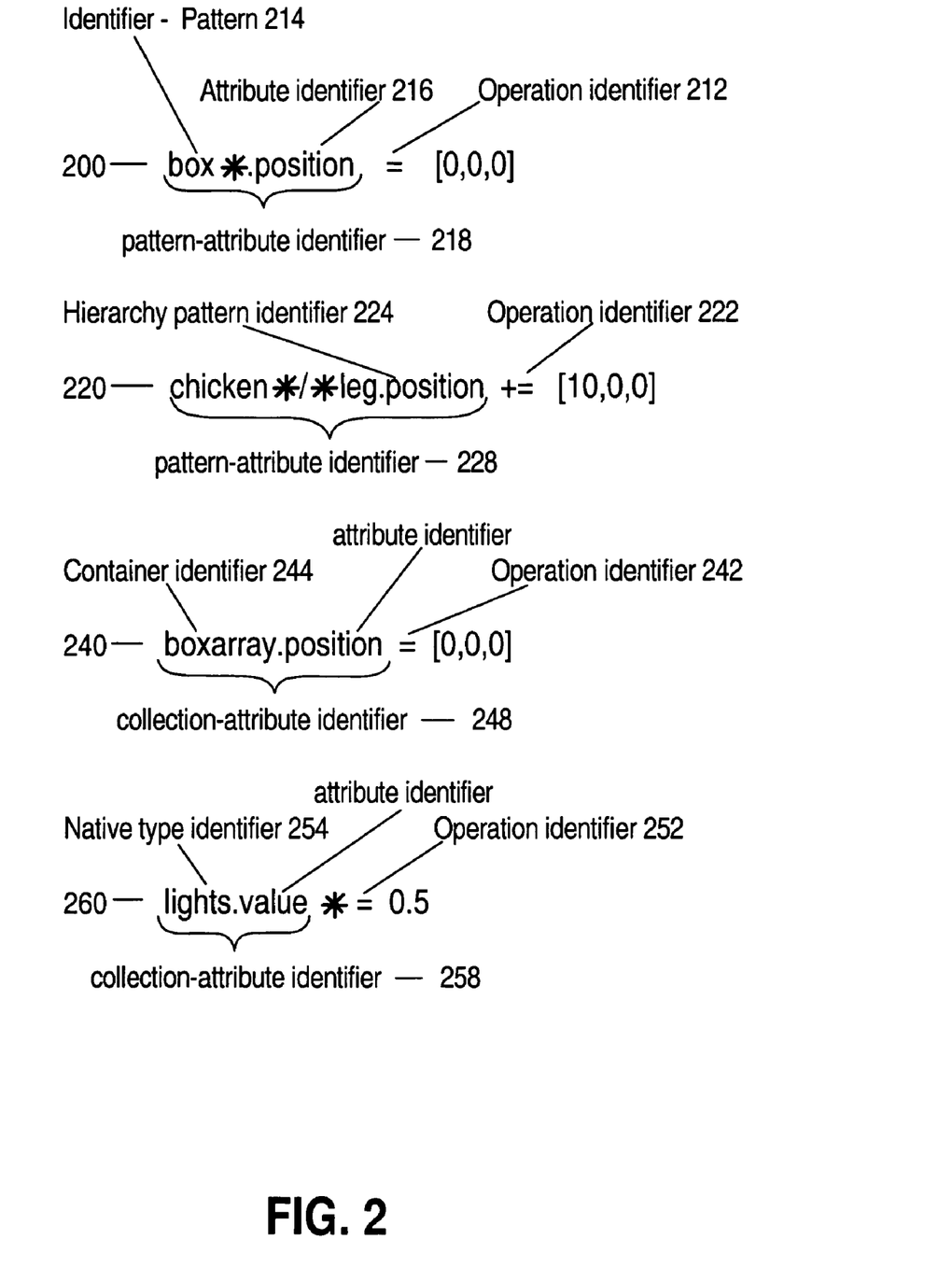
FIG. 2 depicts statements written a scripting language used to illustrate an embodiment of the present invention.

The techniques described herein involve executing statements that specify a set of objects and an operation to be applied to an attribute of each object in the set of objects. According to a technique for identifying a set of objects, the objects of the set are identified through the use of matching criteria specified in a statement. FIG. 2 depicts statements that specify that an operation should be applied to a set of objects, including a set of objects identified through the use of matching criteria.

Referring to FIG. 2, statement 200 specifies an operation is to be applied to a set of objects that are identified by matching criteria, where each object in the set is associated with an identifier that the satisfies the matching criteria. Statement 200 includes operation identifier 212, which identifies an assignment operation and references pattern-attribute identifier 218. Pattern-attribute-identifier 218 includes identifier-pattern 214, and attribute-identifier 216. Pattern-attribute-identifier 218 conforms to object-dot-attribute notation, including an object indicator in the form of identifier-pattern 214.

An identifier-pattern is data, such as a string, that specifies pattern matching criteria for object identifiers. CAD system 100 uses an identifier-pattern to determine which objects' attributes are applied to an operation. For any graphical component associated with an object identifier that matches the criteria specified by identifier-pattern 214, CAD system 100 applies the operation to the attribute of the graphical component associated with object identifier.

For example, a scene contains graphical components box01, box02, and box03, and other graphical components associated with other object identifiers. Identifier-pattern 214 contains the wild card character '*', thus any identifier that begins with string 'box' satisfies the criteria specified by identifier-pattern 214. When CAD system 100 executes statement 200, it applies the assignment operation to the position attribute of box01, box02, and box03.

The techniques described herein are not limited to the use of the wild-card characters, or the use of the wild card character "*", or any particular set of wild-card characters. For example, the following wild-card characters may be supported by the script processor:

| To match | Use this wildcard | For example |
| --- | --- | --- |
| Any string of characters | * | b*d matches "bad" and "batched" |
| Any single character | ? | p?t matches "pat" and "pit" |
| One of the specified characters | [ ] | m[ie]t matches "met" and "mit" |
| The beginning of a word | < | <(ab) matches "abstain" and "absent", but not "slabs" |
| Any single character except the characters specified | [!] | [!b]it matches "fit" and "sit", but not "bit" |
| Any single character except characters in the specified range | [!x-z] | [!a-f]it matches "sit" but not "bit" or "fit" |

Hierarchical Identifiers and Pattern Identifiers

A relational graphical component may be identified by using a hierarchical identifier. A hierarchical identifier identifies a particular graphical component by specifying its relationship to other related graphical components in a component hierarchy. For example, assume shoulder component 124, upper arm component 126, and elbow component 128 are associated with the identifiers John's_shoulder, upper arm, and elbow, respectively. The following hierarchical identifier may be used to identify shoulder component 124.

John's_shoulder/upper arm/elbow

With hierarchical identifiers, graphical components may each be associated with same identifier but may uniquely identified through use of the hierarchical identifiers. Thus, in addition to elbow component 128, another graphical component may be associated with the identifier elbow, but may be uniquely identified. For example, the identifiers 'upper arm' and 'elbow' may be used for components that represent someone else's arm other than John's—Tom's_shoulder/upper arm/elbow.

A hierarchical pattern identifier specifies a pattern for hierarchical identifiers. CAD system 100 uses hierarchical pattern identifiers to determine which objects have the attributes to apply to an operation.

Referring to FIG. 2, statement 220 includes operation identifier 222, which identifies an assignment operation. Operation identifier 222 references pattern-attribute-identifier 228, which includes hierarchy pattern identifier 224. When CAD system 100 executes statement 220, it applies the assignment operation to the position attribute of graphical components associated with hierarchical identifiers that match the pattern matching criteria specified by hierarchy pattern identifier 224, adding the value specified by '[10,0,0]' to the current value of the position attribute. For example, assume that a scene depicts a farm with farm animals, such as pigs, horses, cows, and chickens. Graphical components 'chicken01/right_ leg', 'chicken01/left_leg', 'chicken02/right_leg', 'chicken02/left_leg', and 'chicken03/right_leg', 'chicken03/left_leg' are graphical components in the scene used to represent the legs of all the chickens in the scene. When CAD system 100 executes statement 220, it applies the assignment operation to position attribute of the graphical components depicting chicken legs in the scene.

Object Collection Identifiers

An object collection identifier is an identifier that may be associated with a collection of objects. A statement may specify that an operation should be applied to the attribute of each member of a collection of objects associated with an object collection identifier. In response to encountering such a statement in a script, CAD system 100 applies the operation accordingly. According to an embodiment of the present invention, the collection and the attribute are identified through the use of a collection-attribute-identifier, which has the following format.

<collection identifier>.<attribute identifier>

An example of an object collection identifier is an identifier associated with a container object. A container object is an object used to manage a set of objects. An object that belongs to a set managed by a container object is "contained" by the object. An array is an example of a container object. Each element of an array may be an object, or may refer to an object. In object oriented technology, a container object may be associated with methods, that, for example, are used for creating a member of the collection, adding an object to the collection, or deleting a member object from the collection.

When CAD system 100 encounters an operation identifier that references a collection-attribute identifier, CAD system 100 applies the identified operation to the identified attribute of each member of the collection of objects associated with the collection identifier. For example, statement 240 contains collection-attribute identifier 248, which is referenced by operation identifier 242. Collection-attribute identifier 248 includes container identifier 244, which refers to boxarray. Boxarray is an array explicitly declared in a script (the declaration is not shown), and is used to track graphical elements that represent boxes. When CAD system 100 executes statement 240, CAD system 100 applies the assignment operation to the position attribute of the graphical elements referred to by an element of boxarray.

Another kind of object collection identifier that may be used is a native type identifier, as illustrated by statement 260. In statement 260, operation identifier 252 references collection-attribute-identifier 258. Collection-attribute-identifier 258 includes native category identifier 254, which identifies a native type. When CAD system 100 encounters a collection-attribute-identifier referenced by an operation identifier, and the collection identifier in the collection-attribute identifier identifies a native type identifier, then CAD system 100 applies the identified operation to the identified attribute of each graphical component that is an instance of the native type in a scene.

The techniques described herein are not limited to use of collection identifiers that identify native types or container objects. Any collection identifier that identifies a set of objects may be used. Therefore, the techniques described herein are not limited to any particular type of collection identifier.

In addition, the techniques described herein are not limited to referencing attributes and objects by prefixing them. Instead, any technique for referencing attributes of objects may used. For example, the following statements specify that the move operation is to be applied to the position attribute of a set of objects, or to the set of objects whose identifiers match particular matching criteria.

MOVE POSITION OF OBJECTS BOXARRY TO [0,0,0]
MOVE POSITION OF OBJECTS BOX* TO [0,0,0]

Hardware Overview

Figure 3:
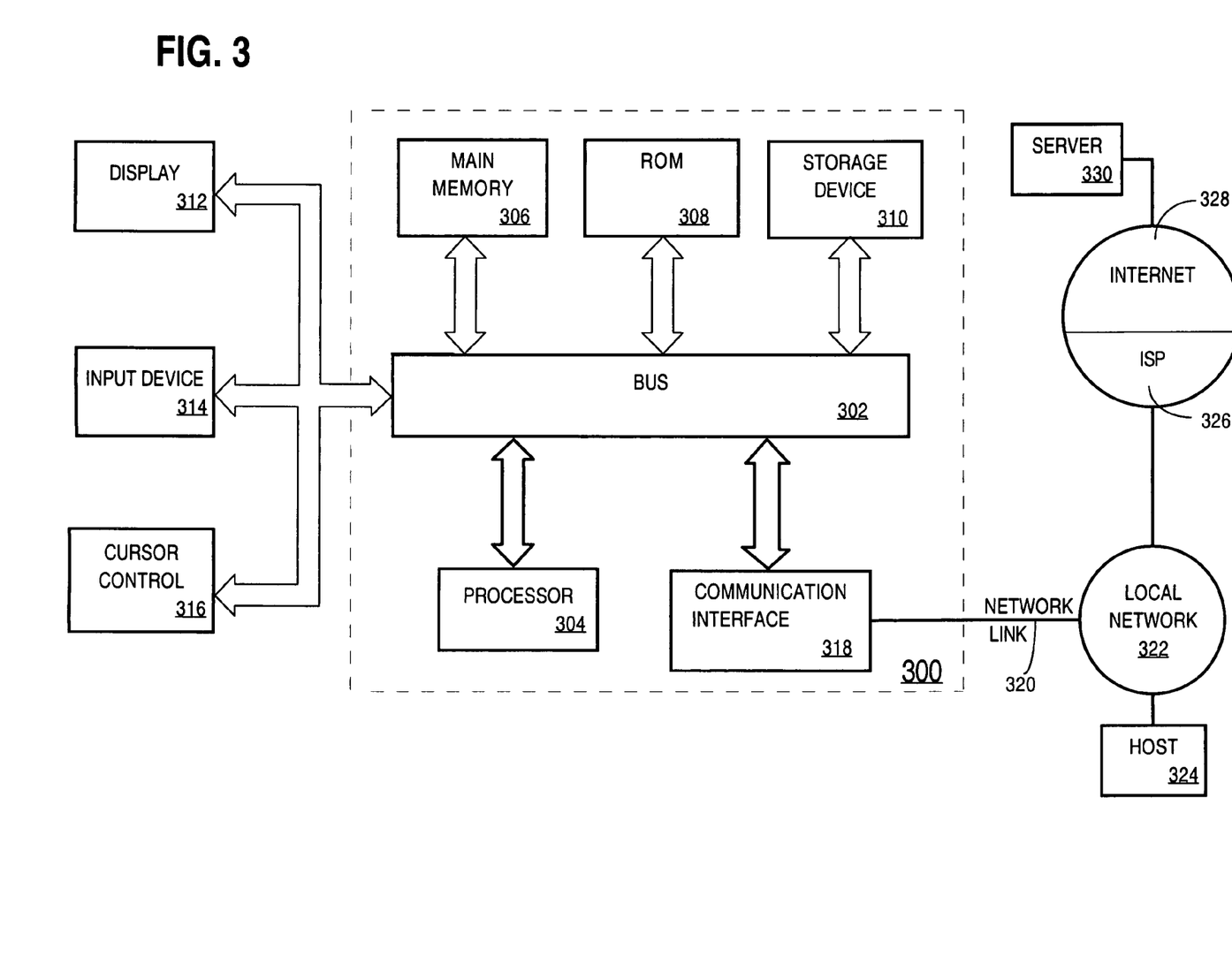
FIG. 3 depicts a block diagram depicting a computer system according to an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are implemented by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media and volatile media media. Non-volatile media includes, for example, optical or magnetic disks, such as storage device 310. Volatile media includes dynamic memory, such as main memory 306.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application implements the techniques described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for performing an operation on a set of graphical components in a computer-aided design (CAD) application executing on a computer system, the method comprising the steps of:

detecting that a statement includes:
an operation identifier that specifies said operation,
pattern matching criteria comprising an identifier associated with a container object that is associated with one or more graphical components, and
an attribute identifier that identifies an attribute; and
executing said statement by
identifying said set of graphical components that satisfy said pattern matching criteria, wherein a graphical component satisfies said pattern matching criteria when the graphical component is one of the one or more graphical components associated with the container object, and wherein said set of graphical components includes at least two graphical components,
performing said operation on said attribute of each graphical component in said set of graphical components that satisfy said pattern matching criteria,
generating a frame within an animation by altering state information corresponding to each graphical component in said set of graphical components, and
displaying said frame on a display device or storing said frame in a memory.

2. The method of claim 1, wherein said statement includes a first string of characters that contains at least one wild card character and that specifies said pattern matching criteria.

3. The method of claim 2, wherein said first string is part of a second string of characters, wherein said second string of characters includes said attribute identifier and is in a format that conforms to object-dot notation.

4. The method of claim 1, wherein said statement is written in a scripting language and the step of detecting is performed by a script processor.

5. The method of claim 1, wherein step of detecting that a statement contains pattern matching criteria includes detecting that the statement contains pattern matching criteria for a hierarchical identifier.

6. The method of claim 1, further comprising the step of changing the value of another attribute, the other attributes not associated with the identifiers that satisfy said pattern matching criteria.

7. The method of claim 1, wherein the container object comprises an array.

8. A computer-implemented method for performing an operation on collections of graphical components in a computer-aided design (CAD) application executing on a computer system, the method comprising the steps of:
detecting that a statement includes:
an operation identifier that specifies said operation,
an identifier associated with a container object that that is associated with a collection of graphical components, and
an attribute identifier that identifies an attribute of a member graphical component of said collection of graphical components; and
executing said statement by
identifying member graphical components of said collection of graphical components, wherein said collection of graphical components includes at least two graphical components, and wherein a graphical component comprises a member graphical component when the graphical component is included in the collection of graphical components associated with the container object,
performing said operation on said attribute of each graphical component of said identified member graphical components,
generating a frame within an animation by altering state information corresponding to each graphical component of said identified member graphical components, and
displaying said frame on a display device or storing said frame in a memory.

9. The method of claim 8, wherein said collection of graphical components is an array.

10. The method of claim 8, wherein said collection of graphical components includes all instances of a native type of graphical components managed by a CAD system.

11. The method of claim 10, wherein said native type is a map type of graphical components, wherein a map type defines a surface.

12. The method of claim 8, further comprising the step of changing the value of another attribute, the other attribute not associated with the attribute identifier.

13. The method of claim 8, wherein the container object comprises an array.

14. A non-transitory computer-readable storage medium storing one or more sequences of one or more instructions that, when executed by one or more processors, cause a computer system to execute an operation on a set of graphical components, by performing the steps of:
detecting that a statement includes:
an operation identifier that specifies said operation,
pattern matching criteria comprising an identifier associated with a container object that is associated with one or more graphical components, and
an attribute identifier that identifies an attribute; and
executing said statement by
identifying all graphical components that satisfy said pattern matching criteria, wherein a graphical component satisfies said pattern matching criteria when the graphical component is one of the one or more graphical components associated with the container object, and wherein at least two graphical components satisfy said pattern matching criteria,
performing said operation on said attribute of each of said graphical components that satisfy said pattern matching criteria,
generating a frame within an animation by altering state information corresponding to each graphical component in said set of graphical components, and
displaying said frame on a display device or storing said frame in a memory.

15. The computer-readable medium of claim 14, wherein said statement includes a first string of characters that contains at least one wild card character and that specifies said pattern matching criteria.

16. The computer-readable medium of claim 15, wherein said first string is part of a second string of characters, wherein said second string of characters includes said attribute identifier and is in a format that conforms to object-dot notation.

17. The computer-readable medium of claim 14, said statement is written in a scripting language and the step of detecting is performed by a script processor.

18. A non-transitory computer-readable storage medium storing one or more sequences of one or more instructions that, when executed by one or more processors, cause a computer system to execute an operation on collections of graphical components, by performing the steps of:
detecting that a statement includes:
an operation identifier that specifies said operation,
an identifier associated with a container object that that is associated with a collection of graphical components, and an attribute identifier that identifies an attribute of a member object of said collection of graphical components; and executing said statement by identifying member graphical components of said collection of graphical components, wherein said collection of graphical components includes at least two graphical components, and wherein a graphical component comprises a member graphical component when the graphical component is included in the collection of graphical components associated with the container object, performing said operation on said attribute of each graphical component of said identified member graphical components, generating a frame within an animation by altering state information corresponding to each graphical component of said identified member graphical components, and displaying said frame on a display device or storing said frame in a memory.

19. The computer-readable medium of claim 18, wherein said collection of graphical components is an array.

20. The computer-readable medium of claim 18, wherein said collection of graphical components includes all instances of a native type of graphical components managed by a CAD system.

* * * * *

UNITED STATES PATENT AND TRADEMARK OFFICE
CERTIFICATE OF CORRECTION

| | | |
|---|---|---|
| PATENT NO. | : 7,817,158 B1 | Page 1 of 1 |
| APPLICATION NO. | : 09/426143 | |
| DATED | : October 19, 2010 | |
| INVENTOR(S) | : Wainwright | |

It is certified that error appears in the above-identified patent and that said Letters Patent is hereby corrected as shown below:

In column 11, line 49, please replace "that that" with --that--.

In column 12, line 65, please replace "that that" with --that--.

Signed and Sealed this

Eleventh Day of January, 2011

David J. Kappos
*Director of the United States Patent and Trademark Office*